United States Patent Office 3,794,712
Patented Feb. 26, 1974

3,794,712
PREPARATION OF SILICA GELS
Henri A. Aboutboul, Brussels, Belgium, Jerome H. Krekeler, Cincinnati, Ohio, and William Kirch, Clinton, Iowa, assignors to National Petro Chemicals Corporation, New York, N.Y.
Continuation-in-part of application Ser. No. 750,733, Aug. 6, 1968. This application Oct. 26, 1971, Ser. No. 191,977
The portion of the term of the patent subsequent to Mar. 28, 1989, has been disclaimed
Int. Cl. C01b 33/16
U.S. Cl. 423—338          27 Claims

ABSTRACT OF THE DISCLOSURE

Silica gels having narrow pore diameter distribution in the range of 300–600 A., surface areas in the range from 200–500 m.$^2$/g., pore volumes of from about 2.0 to about 3.5 cm.$^3$/g. and the process of preparing such silica gels directly from water, comprising critically controlled steps of precipitation of the silica gel, aging the precipitated silica hydrogel slurry, reducing the alkaline impurity level in the hydrogel by washing the aged product and freeze drying the hydrogel so as to remove substantially all of the water, i.e. vacuum subliming the water from the gel after freezing said hydrogel particles at a temperature sufficient to maintain the water in the pores in the frozen state.

---

This application is a continuation-in-part of U.S. Ser. No. 750,733, filed Aug. 6, 1968 and now U.S. Pat. No. 3,652,214.

BACKGROUND OF THE INVENTION

Field of the invention

This invention relates to silica gels having a narrow pore diameter distribution in the pore diameter range of 300–600 A., surface areas ranging from 200–500 m.$^2$/g., pore volumes of from about 2.0 to about 3.5 cm.$^3$/g. and to a process for preparing such silica gels directly from an aqueous system.

DESCRIPTION OF THE PRIOR ART

Much of the technology in the area of silica gels involves the problem of making strong hard porous gel masses which will not shrink and crack upon being dried. The gels are useful as absorbents and catalyst bases. Gels of small particle size and narrow particle size distribution, about 50 microns mean diameter, have been found to be the most desirable for fluid bed or stirred reactor catalyst operations because they are more easily fluidized, reduce the amount of erosion of equipment and suffer less degradation by abrasion and particle rupture.

The only such silica gels thus far known having suitable particle size and narrow pore size distribution in the range of 300–600 A. and surface area of 200–500 m.$^2$/g. for the purpose mentioned above are those described in co-pending application Ser. No. 750,734,[1] filed Aug. 6, 1968. In that application there was disclosed a process for preparing the gels with the specified properties. See also co-pending application Ser. No. 766,693,[1] filed Oct. 11, 1968.

Because the water is strongly absorbed on the silica gel by hydrogen bonding to the silanol groups which cover the surface, the process described in Ser. No. 750,734 included a cumbersome step of displacing the water with a non-aqueous system prior to drying the gel to reduce the surface tension and other interfacial forces involved in the dehydration process.

[1] Both continued-in-part as Serial No. 191,977 and 192,134, both filed Oct. 26, 1971, respectively.

The above-described process has also the disadvantage of being rather expensive since it entails the use of large amounts of organic solvents, a substantial proportion of which generally cannot be recovered.

The drying of the silica gel in order to avoid shrinkage was also described by Kistler in U.S. 2,093,454 and 2,249,767. The patents describe a process of heating the gel under sufficient pressure to provide evaporation within the gel, without gas phase formation until the critical temperature of the liquid is reached. At this point, the liquid phase is converted to the gas phase instantaneously, thus avoiding a gas-liquid interference. Once the gas phase has been reached, the gas may be withdrawn without causing any collapse of the solid structure. However, when the liquid phase of the silica gel is water, this process cannot be used since such gels ordinarily undergo dissolution before the critical temperature is reached. The aqueous phase of the hydrogel has then to be replaced with an organic solvent as in co-pending application Ser. No. 750,734 filed Aug. 6, 1968 with the above-described disadvantages.

By maintaining critical control of conditions during precipitation, heat aging, control of alkaline impurity level by washing and by freezing and vacuum drying the gel while the water in the pores of the gel is maintained in the frozen state, it has now been found that the desired product is obtained directly from an aqueous system.

SUMMARY OF THE INVENTION

Figure 1:
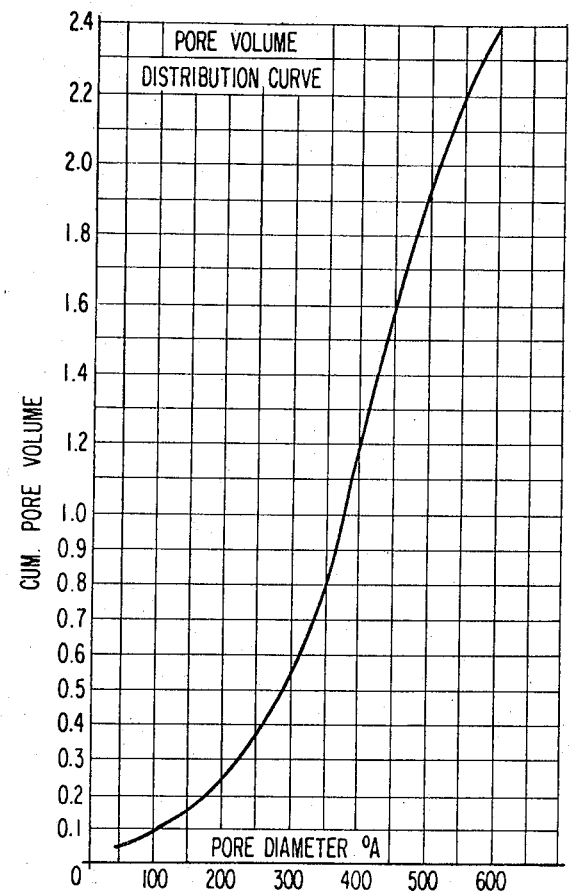
FIG. 1 shows the pore size distribution for the silica xerogel produced by the process of Example I.

The present invention provides silica xerogels having a narrow pore diameter distribution primarily in the range of from 300–600 A., surface areas ranging from 200–500 m.$^2$/g., pore volumes of from 2.0 to about 3.5 cm.$^3$/g., and stability at temperatures of up to about 2,000 °F. in a fluidized bed. The invention further contemplates a process for preparing the foregoing silica xerogels which comprises the following steps:

1. Precipitation of a silica gel by reaction of a water soluble silicate to precipitate the silica therefrom, e.g., by neutralization of an aqueous alkaline silicate solution, most preferably, $xNa_2O \cdot ySiO_2$, with a strong acid, a weak acid such as $CO_2$, ion exchange resins or by any other suitable neutralization procedure, carried out in about stoichiometric proportions under good agitation, e.g., high shear agitation. The primary criterion which any silica source must exhibit to be useful in the present process is that it must permit the silica to be introduced into the aqueous system in the form of a water soluble silicate which can yield very small dense particles of silica which gel or precipitate to yield the hydrogel. For instance, a water soluble alkaline silicate such as a sodium silicate can be neutralized by a controlled acid addition, e.g., with sulfuric acid to yield very small dense particles of silica which in turn gel to give the hydrogel. The acid neutralization will also yield an acid-base salt, for instance sodium sulfate from the neutralization of a sodium silicate with sulfuric acid. A part of such a salt becomes entrapped in the hydrogel during precipitation and must be washed therefrom as described in Step 3.

For commercial use, water soluble silicates are commonly available as alkaline silicates, including the sodium silicates, the potassium silicates, the crystalline quaternary ammonium silicates, the lithium silicates, etc. The sodium silicates are preferred as they are inexpensive and readily available at varying silicate contents, depending upon the producer. The following discussion will be in terms of the precipitation of the hydrogel from an aqueous alkaline silicate solution. The water soluble silicate selected must be such that precipitation is in accordance with the following conditions to provide a silica xerogel of the necessary parameters especially suited for use as a catalyst for olefin polymerization:

1. (a) The $SiO_2$ concentration in the final slurry is between 5 and 12 percent by weight and preferably from about 8 to about 9 percent. Outside of this range, the gel cannot be preserved.
   (b) The neutralization medium is added at a rate such that the gel point is reached in from 30 minutes to 120 minutes, and preferably about 60 minutes, whereafter the remaining amount of the neutralization medium required to provide a pH as called for in Step 1(d) is added. Usually up to 40 percent of the required amount of the neutralization medium is added in from about 30 to 120 minutes, whereafter the remaining 60 percent or more of the neutralization medium is added. Since the neutralization is exothermic, the post-gel point addition of the balance of the neutralization medium should not be at a rate which causes the temperature to rise outside of the range specified in Step 1(c). The post-gel point rate of neutralization medium addition should also not be so rapid as to cause large localized areas where the pH drops below the lower limit of the range specified in Step 1(d). Typically, at least 20 minutes serves as a practical minimum time for post-gel points neutralization medium addition. Long addition periods can be used but are unnecessary so long as the above temperature/pH criteria are met. Preferably, the post-gel point addition of the neutralization medium is accomplished in from about 20 to 90 minutes more, and preferably about 45 minutes more.
   (c) The temperature during precipitation is maintained between about 0 to about 17° C., preferably 0 to about 10° C. and most preferably at about 5° C., and
   (d) The pH during precipitation is from 3 to 8 and preferably between about 5 to about 7.

2. Aging the precipitated silica hydrogel slurry under the following conditions:
   (a) At a pH from 3 to 8, preferably between about 4 and about 7, and preferably at a temperature between about 50° C. and about 100° C., most preferably between about 90° C. and about 95° C.
   (b) For a period of time sufficient to strengthen the fragile gel structure, preferably from about 1 to about 6 hours and more preferably from about 2 to about 4 hours.

The aging of Step 2 is necessary to strengthen the fragile gel, which will otherwise be destroyed during subsequent processing. It is critical during aging that:

(1) the pH range be maintained in the range of 3 to 8; and
(2) the pH, temperature and time be correlated in a very specific manner.

Amplifying upon the need for strict pH control, as the pH of the hydrogel slurry approaches 3 the qualities of the final gel begin to deteriorate and it is impossible to obtain a final gel of the desired properties. Thus, aging at a pH lower than the pH 3-4 range is prohibited. On the other hand, as the pH becomes too alkaline, the properties of the final gel also suffer. The upper pH limits can only be defined with an operating temperature. At the higher acceptable temperature levels, i.e., the 90°+C. range (considered most desirable since low temperatures significantly increase the required time), as the pH approaches 8 the properties of the final gel also suffer, and aging at a pH greater than the pH 7–8 range is prohibited. If the temperature of heat aging is decreased, the allowable pH of aging may be increased over the values stated.

With respect to the correlation of the pH, temperature and time, the following relationships have been established.

If the pH is lowered at constant temperature, the time of aging must be increased. If the pH is lowered at constant aging time, the temperature must be increased. Obviously, both time and temperature can be increased to obtain the same effect. The reverse is true for aging at higher pH's.

If pH is constant, lowering the temperature of aging requires longer aging times to be used and raising the temperature of aging requires shorter aging time to be used.

Considering the above factors, pH is usually the parameter held constant during the aging as variation from the described range destroys the gel. Operation will generally be in the pH 5 to 7 range to allow a safety factor between the pH limits of 3 and 8.

With the pH in the 5 to 7 range, the temperature is almost always maintained above 50° C., and thus the preferred agings may be considered heat accelerated agings. While aging will proceed at much lower temperatures, at a pH of just above 3 and a temperature in the area of 17° C. aging will take weeks, which is commercially unacceptable. While the maximum aging time and the minimum aging temperature are thus not overly critical per se, they must be appropriately correlated with pH.

(3) Reducing the alkaline material concentration of the hydrogel by washing the hydrogel with a liquid which is capable of displacing the alkaline material entrapped in the hydrogel during precipitation until the resulting wash liquor at equilibrium contains less than about 20 p.p.m. (weight parts) of the alkaline material expressed as the acid-base salt. For the neutralization of a sodium silicate with sulfuric acid, less than 20 p.p.m. sodium expressed as sodium sulfate, when the sodium in the product is in equilibrium with the wash liquor at room temperature, i.e., less than about 1,500 p.p.m. (weight parts) sodium expressed as sodium sulfate in the dried gel. The product is then preferably washed with water if water is not the displacing liquid. For certain end uses, e.g., where the dry gel is to be calcined at high temperature, say 1,800° F., for activation as a catalyst base, it is preferred to wash to less than 1,000, more preferably 600 p.p.m. (weight parts) of the alkaline material in the dried gel. Generally, the higher the calcination temperature the lower the amount of alkaline material permitted in the final gel. Preferred washing liquids are solutions of salts such as aluminum chloride or sulfate and ammonium chloride or nitrate. The displacing can also be accomplished by washing with an acid such as hydrochloric, sulfuric, or nitric acid or with water, though washing only with water is more time consuming. Dilute solutions of these acids must be used so the lower pH limit of 3 referred to previously not be exceeded, i.e., the pH does not fall below 3.

In those instances where the water soluble alkaline silicate has been neutralized with an ion exchange resin, it will, of course, be necessary to separate the hydrogel from the then alkaline form of the ion exchange resin.

(4) Vacuum freeze drying the product.

The above procedure (Steps 1 to 4) provides a silica gel in accordance with the described parameters. However, many users will desire a silica gel of a particular particle size, e.g., one adapted to serve as a catalyst support for use in fluidized beds most especially a catalyst support for the polymerization of olefins. Accordingly, one may wish to comminute or homogenize and reduce gel particle size by high shear mixing. This optional step may be done by high shear mixing the product from Step 3 to obtain particles having a desired mean diameter for instance, a mean diameter of less than about 200 microns, preferably in the range of from 30 to 150 microns. If, however, good agitation is used during precipitation, e.g., high shear agitation, and careful pH, temperature and time control is maintained on the intermediate product during aging, usually but not necessarily combined with agitation during aging, a separate comminuting step can be omitted as the particles will have a mean diameter of less than about 200 microns.

A comminution of homogenization may be necessary in some instances where agitation is not carried out during the aging of Step 2 and process conditions are not critically observed. In such a case, the required comminution may be carried out either prior to alkaline material displacement, intermediate alkaline material displacement and washing with the water miscible organic liquid or after both alkaline material displacement and washing with the water miscible organic liquid. It is preferred to comminute at a point no later than alkaline material displacement as small particles are much more easier to wash.

DETAILED DESCRIPTION OF THE INVENTION

The invention will now be described in greater detail with reference to specific examples which illustrate the criticality of process conditions in order to obtain a silica xerogel product having a narrow pore diameter distribution primarily in the range of from 300–600° A., a surface area in the range of from 200–500 m.$^2$/g., a pore volume of from about 2.0 to about 3.5 cm.$^3$/g. and stability at temperatures up to 2,000° F. in a fluidized bed.

Preferred silica xerogels obtained in accordance with the present invention have a pore diameter distribution wherein above about 70% of the cumulative pore volume is within the pore diameter range of 300 to 600 A. and a pore volume of 2.2 to 3.0 cm.$^3$/g., most preferably 2.50 to 2.90 cm.$^3$/g.

The properties of the silica xerogel obtained in accordance with the invention and particularly the porosity characteristics are discussed in terms of pore volume (PV), surface area (SA), average pore diameter (Pd), where $$Pd = \frac{4PV}{SA}$$

and pore size distribution. FIG. 5 is a plot of silica gel pore size distribution versus the pore diameter. Determinations of the values for the various properties are made by a nitrogen absorption-desorption technique well-known in the art and described in the literature. For example, descriptions of the nitrogen absorption-desorption procedure for evaluating porosity of silica gels are found in the Journal of the American Chemical Society, vol. 60, p. 309 (1938), Journal of Catalysis, vol. 2, p. 111 (1955) and elsewhere.

In the following example, Example I is a description of a preferred method for carrying out the process of the invention to obtain a silica gel of the stated characteristics. The remainder of the examples illustrate the criticality of various process conditions or describe suitable alternative procedures for obtaining the silica gels.

EXAMPLE I 20,160 g. of sodium silicate solution containing 28.7% SiO$_2$ and 8.9% Na$_2$O was added to 25,440 g. of H$_2$O and the mixture cooled to 5° C. under agitation.

21,305 g. of H$_2$SO$_4$ (12.75 wt. percent) was then added as follows:

8,520 g. was added in one hour and the remaining amount in 45 minutes. The final pH of the slurry was 5.0.

The slurry was then heated to 95° C. within 2 hours and maintained at 95° C. for 2 hours at a pH of 5.0.

A 30 g. sample was drawn and washed with a solution of 10 g. of NH$_4$NO$_3$ in 3,000 ml. of H$_2$O, then with de-ionized water until the wash liquor titrated or contained less than 20 p.p.m. Na$_2$SO$_4$ at equilibrium. To illustrate all the features of the process, the product was homogenized. 10 g. of the resulting slurry containing 8.5% solid was vacuum freeze dried using a New Brunswick Model B-67 freeze dryer. The cold trap was set at −120° C. and the sample, pre-frozen, maintained at −40° F.

The slurry can also be homogenized prior to washing with NH$_4$NO$_3$. Homogenization prior to washing (if homogenization is necessary) is most preferred as smaller particles are easier to wash to the required sodium level.

In a preferred embodiment, for certain end uses, the following optional step can be performed in the process of this invention:

Calcining the product from Step 4 at a temperature between about 500° and about 1,200° F., preferably at about 1,000° F. It should be noted that this final calcination/drying at 500–1200° F. is generally not considered a catalyst activation (which normally requires higher temperatures) but may in certain instances serve that purpose. A specific example of such a calcining/drying is also set out below.

1 gm. of sample was recovered and heated or calcined in an oven at 1000° F. for 4 hours before evaluating it. Physical properties of the silica gel obtained were: S.A.=321 m.$^2$/g., P.V.=2.49 cm.$^3$/g., Pd=312 A.

Calcination in a fluidized bed for 3 hours at 1800° F. to activate the gel for use as a catalyst did not alter the physical properties within the limits of analytical error: S.A.=329 m.$^2$/g., P.V.=2.47 cm.$^3$/g., Pd=301 A. Other activation temperatures may be used.

Referring to FIG. 1 of the drawings, which is a distribution curve of the pore sizes, it will be seen that the major portion of the cumulative pore volume of the silica gel product is accounted for by gel having a pore size distribution in the narrow range of from 300 A. to 600 A.

EXAMPLE II

To compare the freeze drying technique to the water displacement technique, disclosed in co-pending Ser. No. 7550,734, a 30 g. sample was prepared as in Example I and was washed until the filtrate titrated less than 20 p.p.m. Na$_2$SO$_4$. The product was then homogenized, re-slurried in acetone and washed with acetone by decantation until the water in the acetone titrated less than 1% at equilibrium between the wash liquid and the liquid in the pores of the gel.

The acetone was distilled off and the resulting silica gel was calcined in an oven at 1000° F. for 4 hours.

Physical properties of the silica gel obtained were found to be substantially the same as those obtained by the present freeze drying technique, i.e., by the process of Ser. No. 750,734 the properties were S.A.=327 m.$^2$/g., P.V.=2.61 cm.$^3$/g., Pd=319 A.

EXAMPLE III

All the variables during precipitation, except the concentration of the silica, were maintained the same as in Example I. The final SiO$_2$ concentrations of 7% and 10% were chosen and FIG. 2 shows the effect of SiO$_2$ concentration on the porosity of the gel just after precipitation.

Figure 2:
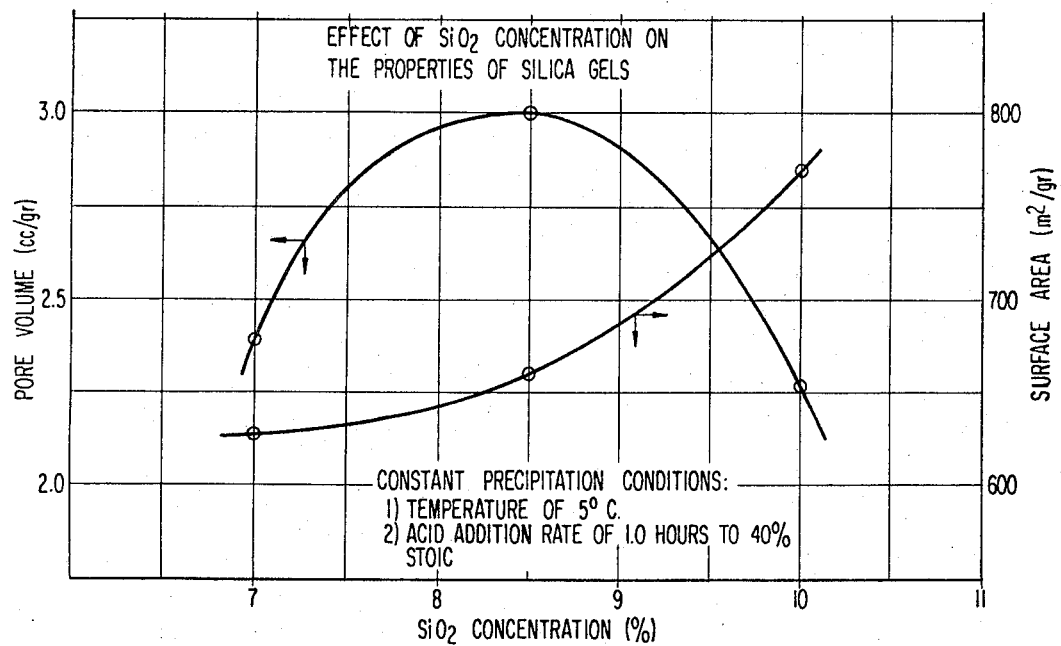
FIG. 2 shows the effect of the final $SiO_2$ concentration in the slurry upon the surface area and pore volume of the product silica xerogel immediately after precipitation.

Referring to FIG. 2 of the drawing, it will be seen that relatively lower pore volumes are obtained where the final silica concentration in the slurry is 7% and 10% as compared with the pore volume obtained in Example I where an SiO$_2$ concentration of about 8.5% was obtained. FIG. 2 also demonstrates that the surface area increases as the SiO$_2$ concentration increases. Thus, in order to get maximum pore volume and at the same time to obtain a good surface area level, it is preferable to maintain the SiO$_2$ concentration at between about 8% and 9% and most preferably at about 8.5%.

The preferred sodium silicates used can be represented by the formula $xNa_2O \cdot ySiO_2$ where $x/y$ is from 1/1 to about 4/1. Corresponding ranges for other water soluble alkaline silicates will be easily calculatable to one skilled in the art.

EXAMPLE IV

All variables during precipitation, except acid addition rate, were maintained as in Example I. Acid additon rate of 0.5 hr. and 2.0 hrs. for the addition of 40% of the stoichiometric amount of $SiO_2$ (the gel point) were used.

Figure 3:
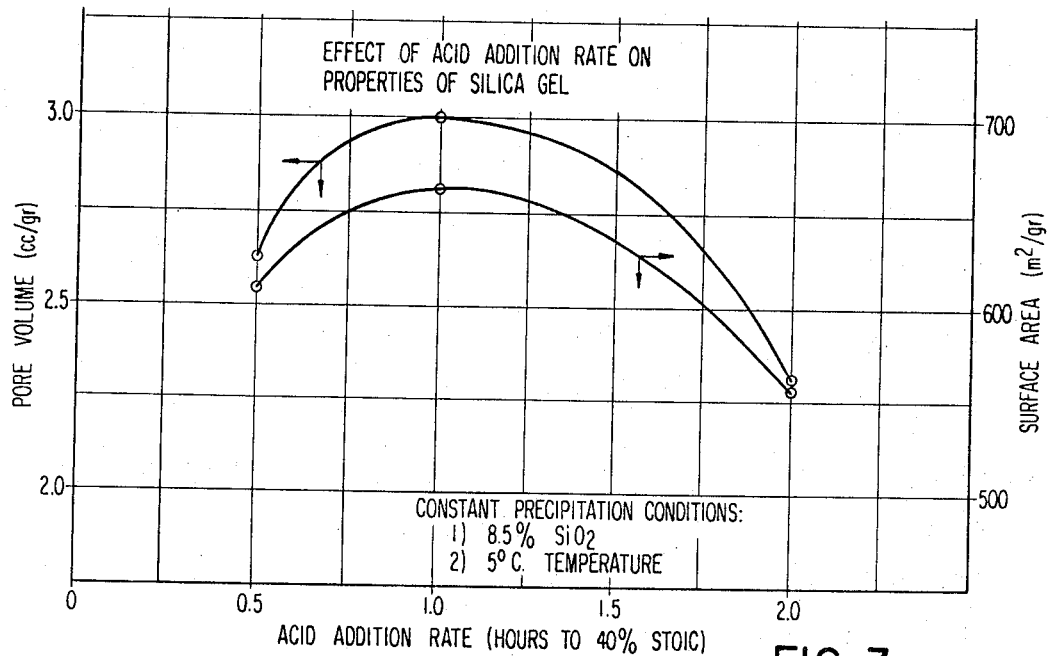
FIG. 3 shows the effect of the rate at which the neutralizing medium is added to the aqueous sodium silicate solution upon the surface area and pore volume of the product silica xerogel immediately after precipitation.

Example IV clearly illustrates, as shown in FIG. 3 of the drawings, that both pore volume and surface area are dependent upon the rate in which the neutralizing medium, in this case, sulfuric acid, is added to the aqueous silicate solution. It will be seen that optimum pore volume and surface area values are obtained using an addition rate of about 1 hour to reach the gel point, for this system about 40% of the stoichiometric amount, and that lower values for pore volume and surface area are obtained where more rapid or slower addition rates are employed fo pre-gel point addition.

EXAMPLE V

All variables during precipitation, except temperature, were maintained as in Example I. Temperatures of 25° C. and 50° C. were used during precipitation.

Figure 4:
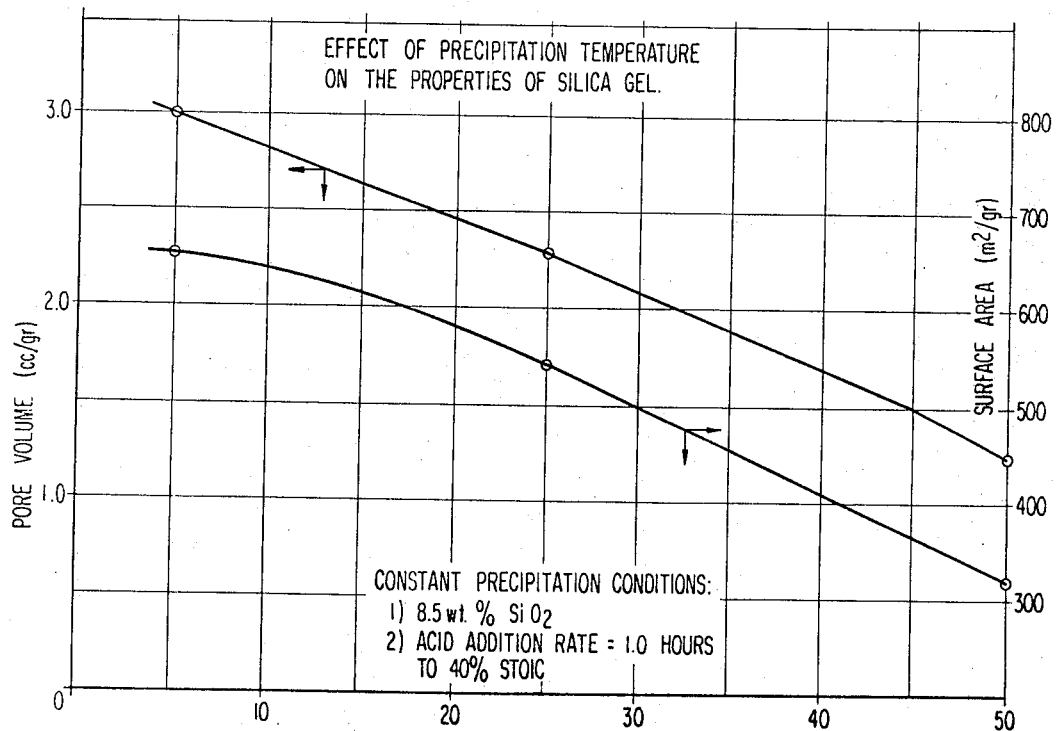
FIG. 4 shows the effect of varying the temperature of precipitation upon the porosity (i.e., pore volume and surface area) of the gel immediately after precipitation.

As will be seen by reference of FIG. 4, the pore volume decreases as the precipitation temperature increases. Surface area also tends to decrease with an increase in the precipitation temperature, but this value flattens out at about 5° C. This is the preferred temperature of precipitation in order to secure optimum values for pore volume and surface area.

EXAMPLE VI

All variables during precipitation were maintained the same as in Example I, except $CO_2$ was used to neutralize the sodium silicate instead of sulfuric acid. The physical properties of the silica gel were similar to those obtained under Example I.

EXAMPLE VII

All variables during precipitation were maintained as in Example I. After precipitation, the gel was adjusted to pH 9.0 by adding NaOH (2-normal) and heating for one hour. The gel was then washed with water and acetone as in Example II before evaluating it.

The properties of the silica gel were S.A.=346 m.²/g., P.V.=1.96 cm.³/g., Pd=226 A.

Comparable results were obtained upon freeze drying.

As will be seen by comparing the properties of the gel obtained in accordance with Example VII with a product of Example I, too high pH and relatively brief heating during the aging step results in a loss of pore volume. The pore volume obtained in Example I was 2.49 cm.³/g. as compared with only 1.96 cm.³/g., for Example VII.

EXAMPLE VIII

All variables during precipitation were again maintained as in Example I. After precipitation the gel was adjusted to pH 5.0 by adding $H_2SO_4$ (1-normal), and heated to 95° C. for 4 hours. Samples were taken after different lengths of time, washed with water and then with acetone as in Example II before evaluating them.

Table I shows the influence of the length of heating time on the porosity of the gel and its pore distribution:

TABLE I

| Time (hrs.) | S.A. (m.²/g.) | P.V. (cm.³/g.) | Pd (A.) |
|---|---|---|---|
| 0 | 757 | 2.77 | 147 |
| ½ | 492 | 2.72 | 221 |
| 1 | 394 | 2.90 | 294 |
| 1½ | 355 | 2.76 | 311 |
| 2 | 343 | 2.77 | 323 |
| 4 | 284 | 2.56 | 362 |

As will be seen from the data reported in Table I, the thermal aging of the precipitation should be conducted for a minimum of about 1 hour in order to obtain a silica xerogel product having an average pore diameter in the desired range of from about 300 to 600 A.

The same trend is illustrated for a freeze dried gel.

EXAMPLE IX

All variables during precipitation and heating were again maintained as in Example I. The gel was then washed as in Example I, but only until the filtrate titrated 100 p.p.m. $Na_2SO_4$. The product was then treated with acetone and evaluated. The physical properties of the gel were substantially the same as in Example I.

When the product was calcined in a fluidized bed at 1825° F. for 3 hours and evaluated, the properties were: S.A.=225 m.²/g., P.V.=1.62 cm.³/g., Pd=286 A.

As will be seen from the porosity values of the product obtained in accordance with Example IX, the surface area pore volume and average pore diameter are all adversely affected by the relatively high level of $Na_2SO_4$ left in the product. The same result is seen in a freeze dried gel.

EXAMPLE X

In this example, a silica gel produced as in Example I was tray dried at 80° C.

Physical properties of the gel were: S.A.=110 m.²/g., P.V.=0.41 cm.³/g., and Pd=149 A.

The product obtained by tray drying at 80° C. is severely adversely affected in terms of surface area, pore volume and average pore diameter in comparison with the results obtained by freeze drying as in Example I.

While the invention has been particularly shown and described with reference to a preferred embodiment thereof, it will be understood by those skilled in the art that various changes in form and details may be made therein without departing from the spirit and scope of the invention.

What is claimed is:

1. A method for producing a silica xerogel having a narrow pore diameter distribution primarily within the range of from 300 to 600 A., a surface area within the range of from 200 to 500 m.²/g., a pore volume of from about 2.0 to about 3.5 cm.³/g. and stability at temperatures up to about 2000° F. comprising:
    (a) precipitating a silica hydrogel, under conditions of good agitation, by the neutralization of an aqueous alkaline silicate solution to provide a silica hydrogel slurry having an $SiO_2$ concentration of from 5 to 12% by weight, the pH during precipitation being maintained between pH 3 and pH 8, the temperature during precipitation being maintained at from about 0° C. to about 17° C., and the neutralizing medium being added to the aqueous alkaline silicate solution at a rate such that the gel point of the solution is reached in from about 30 to about 120 minutes, whereafter the remaining amount of the neutralizing medium required to provide an end pH of between pH 3 and pH 8 is added,
    (b) maintaining the hydrogel slurry from step (a) at a pH within the range of from 3 to 8 at a temperature and for a time sufficient to strengthen the hydrogel structure,
    (c) reducing the alkaline material concentration in the product of step (b) by washing the product of step (b) with a liquid which displaces said alkaline material so that the wash liquor, in equilibrium with the product of step (b), contains less than about 20 p.p.m. of the alkaline material expressed as an acid-base salt thereof, and
    (d) vacuum subliming the water from said hydrogel.

2. The method of claim 1 further comprising:
    (f) calcining the product of step (e).

3. The method of claim 1 wherein the precipitation of silica hydrogel in step (a) is accomplished by neutralization of the aqueous solution of an alkaline silicate with an agent selected from the group consisting of a strong acid, a weak acid, and an ion-exchange resin.

4. The method of claim 1 wherein the alkaline silicate is an alkali metal silicate and the temperature during Step (b) is maintained above the temperature during Step (a).

5. The method of claim 1 wherein the $SiO_2$ concentration in the hydrogel slurry of Step (a) is from about 8 to about 9% by weight.

6. The method of claim 1 wherein the temperature during neutralization Step (a) is from about 0° C. to about 10° C.

7. The method of claim 1 wherein the pH of the hydrogel slurry during Step (a) is maintained at from about 5 to about 7 and the pH of the hydrogel slurry in Step (b) is from about 4 to about 7.

8. The method of claim 1 wherein the temperature of the hydrogel slurry during Step (b) is maintained at about 50° C. to about 100° C. and wherein the time of Step (b) is about 1 to about 6 hours.

9. The method of claim 1 wherein the reduction of concentration of alkaline ions is accomplished by washing with a solution of displacing salts selected from the group consisting of ammonium chloride, ammonium nitrate and mixtures thereof.

10. The method of claim 1 wherein Step (c) is accomplished by washing with a solution of a mineral acid selected from the group consisting of HCl, $H_2SO_4$ and $HNO_3$.

11. The method of claim 1 wherein up to about 40% of the neutralizing medium is added in from about 30 to about 120 minutes and where the remaining neutralizing medium required to provide an end pH of 3 to 8 is added in about 20 to about 90 minutes more.

12. The method of claim 1 wherein said frozen gel is vacuum sublimed so as to remove substantially all of the water.

13. The method of claim 1 where Step (b) is conducted under agitation.

14. The method of claim 1 where the silicate is a sodium silicate of the formula $xNa_2O \cdot ySiO_2$ where $y/x$ is from 1/1 to about 4/1.

15. The method of claim 1 further comprising comminuting the hydrogel after Step (b) but prior to Step (d).

16. A method for producing a silica xerogel having a narrow pore diameter distribution primarily within the range of from 300 to 600 A., a surface area within the range of from 200 to 500 m.²/g., a pore volume of from 2.2 to 3.0 cm.³/g. and stability at temperatures of up to about 2000° F. comprising:

(a) precipitating a silica hydrogel by neutralization of an aqueous solution of sodium or potassium silicate to provide a silica hydrogel slurry having an $SiO_2$ concentration of from 8 to 9% by weight while maintaining the pH at from about 5 to about 7 and maintaining the temperature at from about 0° C. to about 10° C., wherein the neutralizing medium is added to the aqueous sodium or potassium silicate solution at a rate of up to about 40% of the necessary amount in from about 30 to about 120 minutes, and wherein the remaining amount of neutralizing medium necessary to provide an end pH of from about 5 to about 7 is added in a period of time of at least about 20 minutes more, precipitation being under conditions of agitation, (b) heating the product of Step (a) at a temperature greater than that of Step (a) and at a pH of from about 5 to about 7 for at least about 1 hour, while agitating the product of Step (a), (c) reducing the alkali metal concentration of the product of Step (b) by washing the product of Step (b) with a liquid which displaces said sodium or potassium until the resulting wash liquor, at equilibrium with the product of Step (b), contains less than about 20 p.p.m. sodium or potassium, expressed as an acid-base salt thereof, and (d) vacuum subliming the water from said hydrogel, to provide said silica xerogel.

17. The process of claim 16 additionally comprising:

(f) calcining the product of Step (e).

18. The method of claim 16 wherein the precipitation of silica hydrogel in Step (a) is accomplished by neutralization of the aqueous solution of sodium silicate with an agent selected from the group consisting of a strong acid, a weak acid, and an ion-exchange resin.

19. The method of claim 16 wherein the reduction of concentration of alkali metal is accomplished by washing with a solution of displacing salts selected from the group consisting of ammonium chloride, ammonium nitrate and mixtures thereof.

20. The method of claim 16 wherein Step (c) is accomplished by washing with a solution of a mineral acid selected from the group consisting of HCl, $H_2SO_4$ and $HNO_3$.

21. The method of claim 16 where the silicate is a sodium silicate, represented by the formula $xNa_2O \cdot ySiO_2$ and wherein the ratio $y/x$ is from 1/1 to about 4/1.

22. The method of claim 16 further comprising comminuting the hydrogel after Step (b) but prior to Step (d).

23. The method of claim 16 wherein said hydrogel is frozen at a temperature of between $-100°$ C. and $-10°$ C.

24. The method of claim 16 wherein said frozen gel is vacuum sublimed so as to remove substantially all of the water.

25. The method of claim 1 wherein the time of Step (b) is for from about 2 to about 4 hours.

26. The method of claim 16 wherein the time of Step (b) is for from about 1 hour to about 6 hours.

27. The method of claim 26 wherein the time of Step (b) is for from about 2 to about 4 hours.

References Cited

UNITED STATES PATENTS

| | | | |
|---|---|---|---|
| 2,785,051 | 3/1957 | Miller | 423—338 |
| 2,834,739 | 5/1958 | Becker et al. | 423—338 |
| 2,863,727 | 12/1958 | Thornhill et al. | 423—339 |
| 2,978,298 | 4/1961 | Wetzel et al. | 423—338 |
| 3,041,140 | 6/1962 | Alexander | 423—335 |
| 3,081,154 | 3/1963 | Acker et al. | 423—339 |
| 3,337,299 | 8/1967 | Burke, Jr. | 423—332 |
| 3,367,742 | 2/1968 | Marotta et al. | 423—335 |
| 3,428,425 | 2/1969 | Marotta | 423—339 |
| 3,433,593 | 3/1969 | Reinhardt et al. | 423—339 |
| 3,453,077 | 7/1969 | Hyde | 423—338 |

EDWARD STERN, Primary Examiner

U.S. Cl. X.R.

423—335, 339; 252—451